Oct. 16, 1956

R. D. STIEHLER ET AL 2,766,618

TIRE TESTER

Filed Sept. 9, 1954

INVENTOR
Robert D. Stiehler
Andrew P. Gregg

BY Arthur Vinograd

ATTORNEY

Oct. 16, 1956   R. D. STIEHLER ET AL   2,766,618
TIRE TESTER
Filed Sept. 9, 1954   7 Sheets-Sheet 2

INVENTOR
Robert D. Stiehler
Andrew P. Gregg
BY
Arthur Vinograd
ATTORNEY

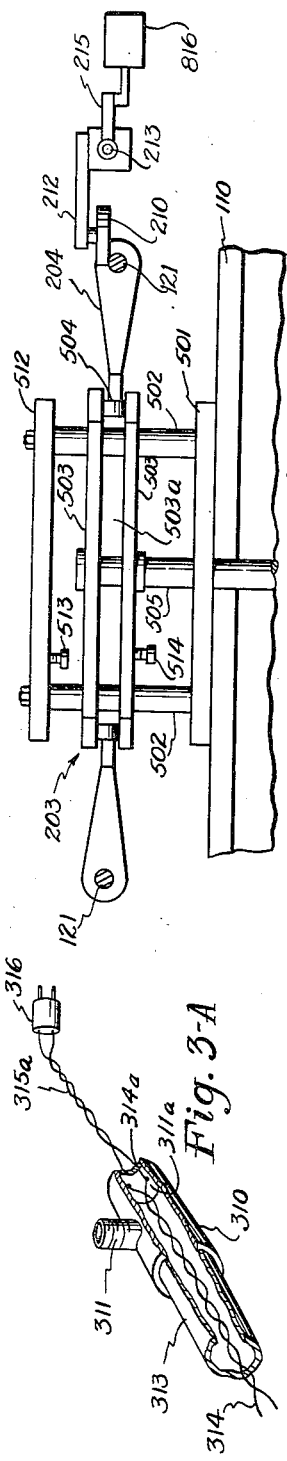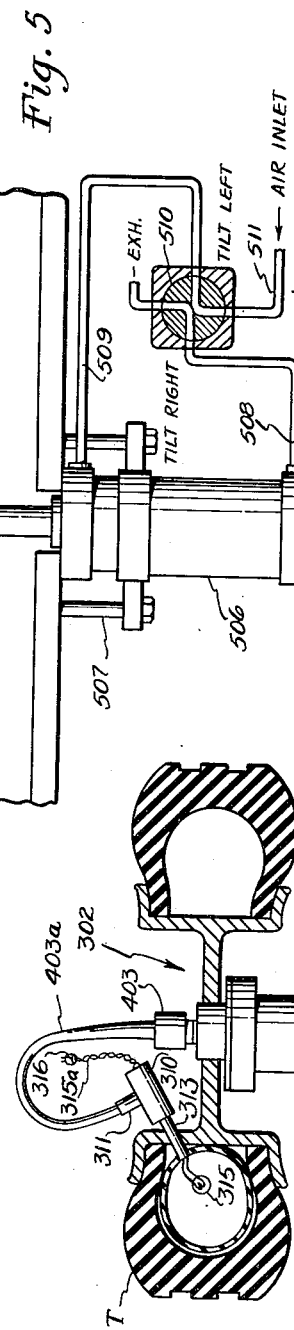

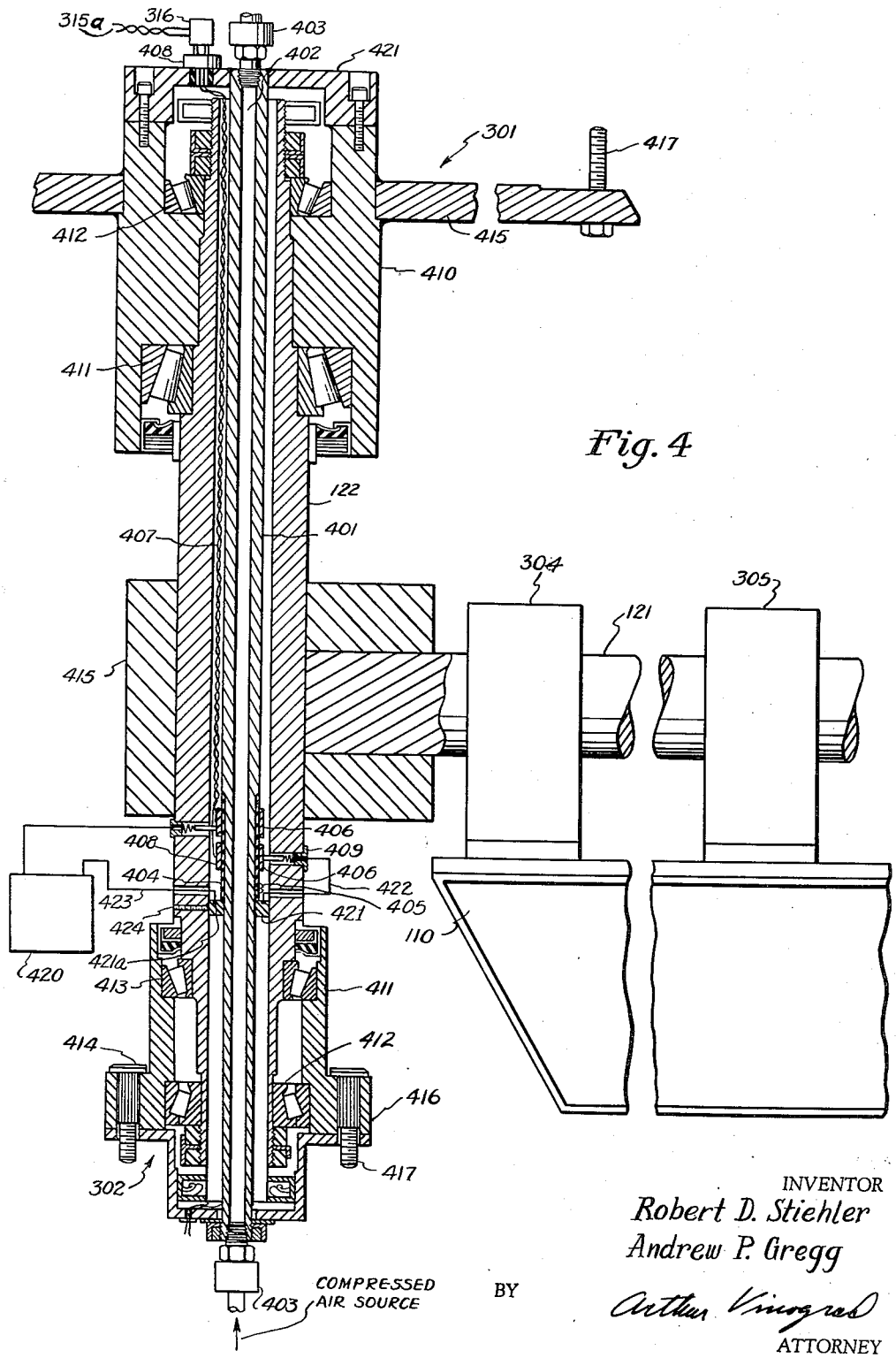

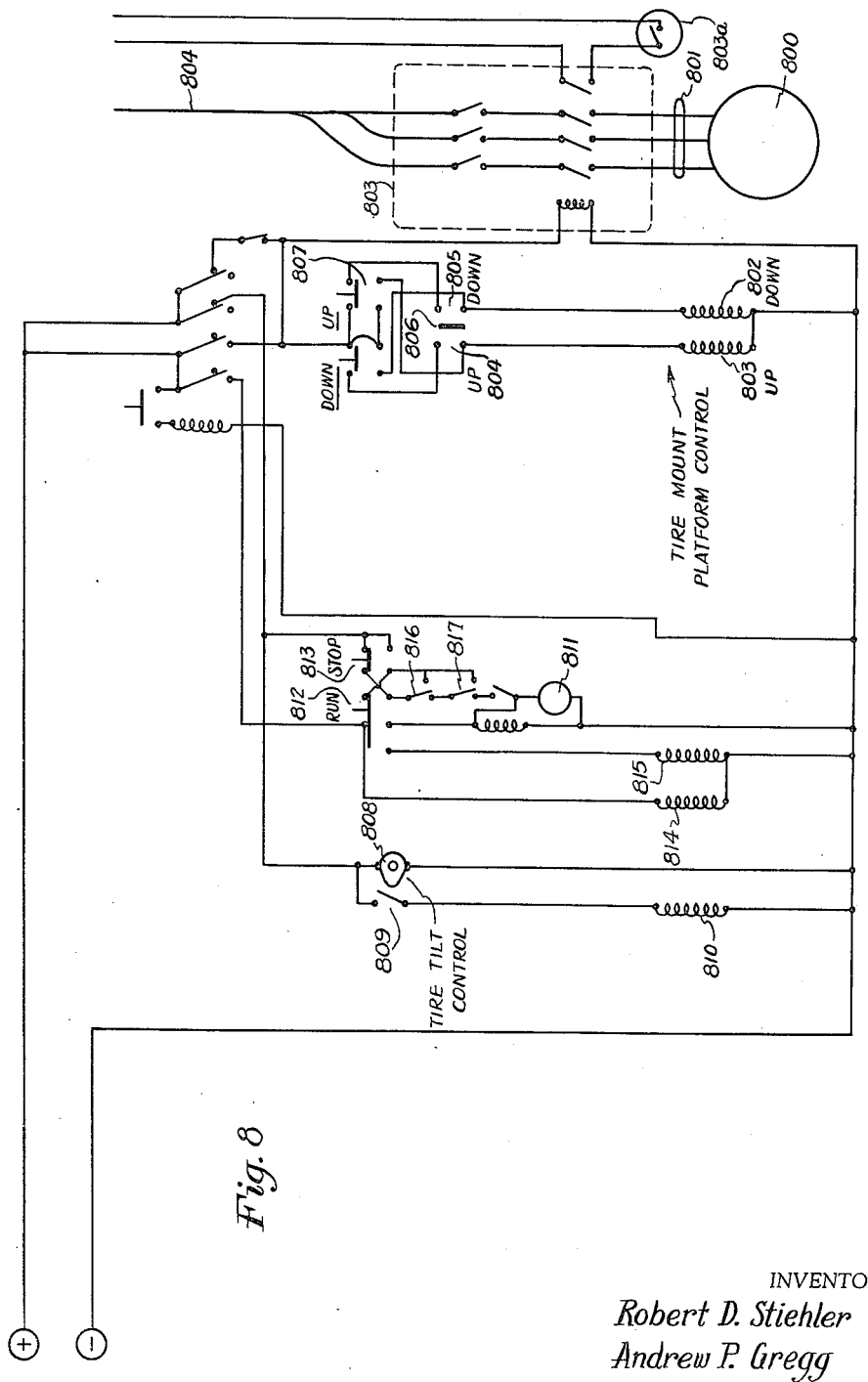

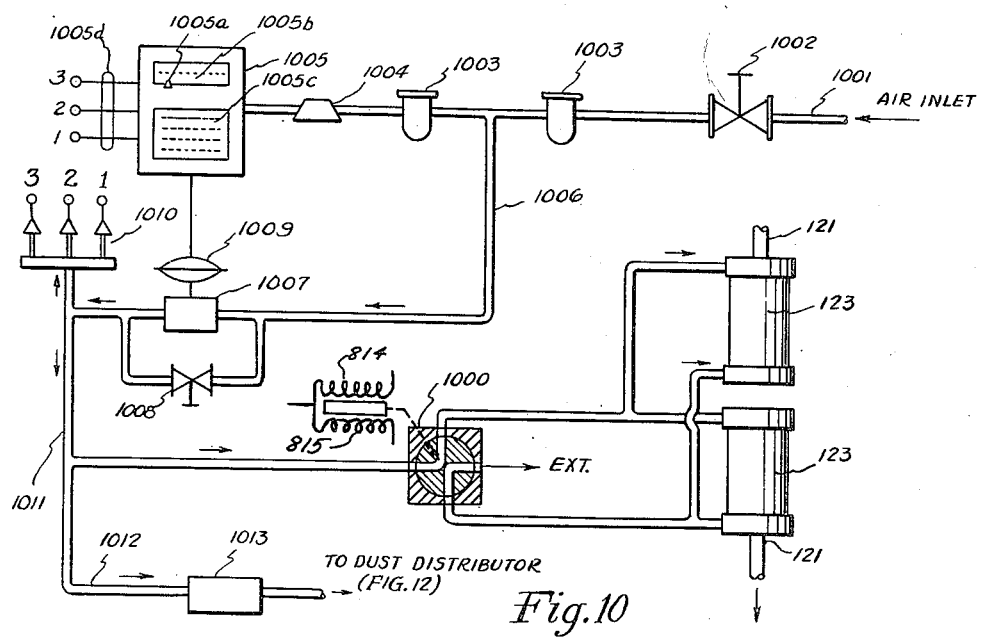
Fig. 10
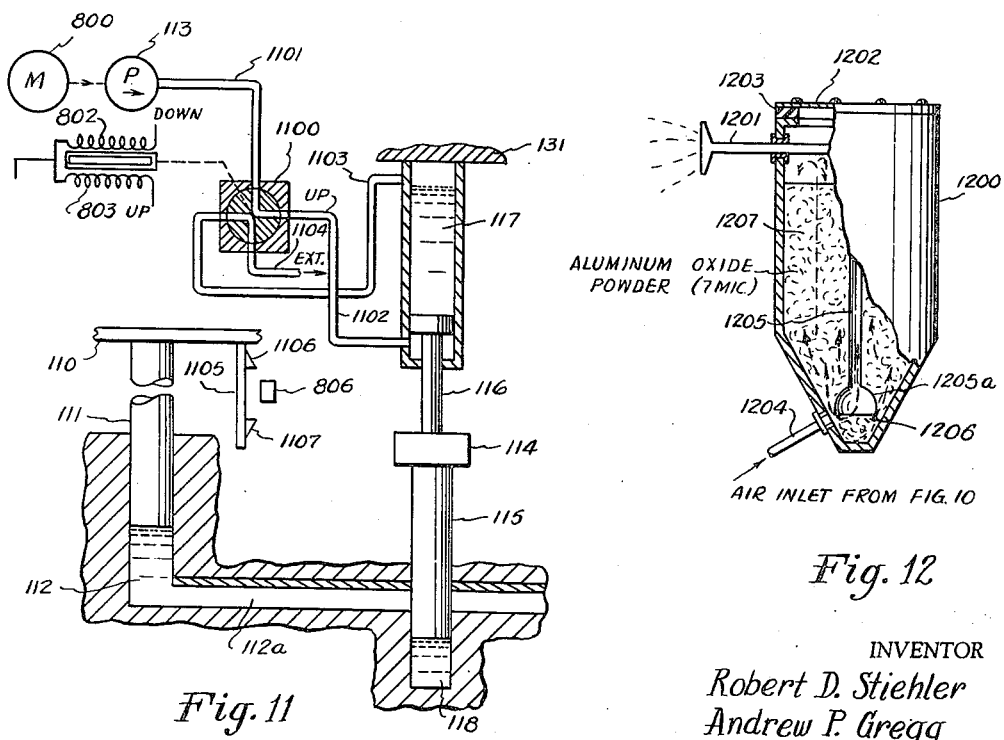
Fig. 11
Fig. 12
INVENTOR
Robert D. Stiehler
Andrew P. Gregg
BY Arthur Vinograd
ATTORNEY United States Patent Office 2,766,618
Patented Oct. 16, 1956

2,766,618

TIRE TESTER

Robert D. Stiehler, Washington, D. C., and Andrew P. Gregg, Hyattsville, Md., assignors to the United States of America as represented by the Secretary of Commerce Application September 9, 1954, Serial No. 455,096

17 Claims. (Cl. 73—146)

This invention relates to tire testers and has for an immediate object the provision of an improved tire testing machine which can subject vehicle tires to realistic tests simulating the various conditions encountered during actual road service.

It is an object of this invention to provide a tire tester in which a plurality of tires can be tested concurrently under identical road service conditions and, furthermore, which is adaptable to accommodate various size tires.

It is another object of this invention to provide a tester which will test vehicle tires not only in connection with conditions simulating the rolling contact of the tire on a road surface, but which will test such tires under conditions and circumstances analogous to those encountered when the vehicle is being steered.

A still further object of this invention is to provide a tire tester in which the vehicle loading effect can be individually adjusted for each tire under test selectively and while the tire is being tested.

A still further object of this invention is to provide a means in connection with a tire tester, to selectively vary the internal pressure of the tire under test and to continuously measure the internal temperature of the tire while the test is in progress.

An additional object of this invention is to provide a tire tester in which actual service conditions are realistically simulated.

In order to ascertain the serviceability of the tire for vehicle requirements under various road and service conditions, it is essential to know in advance the ability of a particular tire to withstand the action of all the forces which a vehicle tire in actual use will be subjected to. In an effort to meet such rigid requirements various tire testers have been devised. For example, in the patent to Sonntag, Patent No. 1,068,180 of July 22, 1913, a frame is provided which rotatably supports a pair of tires which are driven in opposite direction by a central drive wheel mounted intermediate of the tires. Such tester is designed expressly to determine carcass performance and is not suitable for measuring treadwear of a tire.

In the patent to Shaffer, Patent No. 1,478,532, a framework resembling an automobile chassis is provided for testing four tires on four separate drums. The drums drive the tires rotatably and the surface of the drums are provided with various surfaces in simulation of road conditions. Furthermore, braking is provided to obtain slip which will cause treadwear. However, the results obtained by such method of testing are not of great value since tires on the four positions are not subjected to the same conditions of wear. In a construction such as is shown by Shaffer furthermore, the testing track or drum rapidly becomes gummy with rubber so that it no longer simulates a true roadway surface after a short period of use.

The patent to Coffin, Patent No. 1,638,111, shows a tire tester which provides for the simultaneous test of a plurality of tires. In this patent, however, the tires are mounted vertically, that is, to rotate about a horizontal axis, and furthermore the tires are made to run in a relatively narrow track over a horizontal annular roadway. Such tester has the disadvantages inherent in any conventional type of annular track type of tester, namely the tires are not uniformly abraded across the tread. Moreover the track is driven by the tires, according to the construction in this patent, and slip is obtained by tractive or braking effort. In this construction, too, the track rapidly becomes gummy with rubber so that it will no longer simulate a roadway.

In a prior patent to Messer, Patent No. 1,669,622, a tester is provided designed to test twelve tires simultaneously. However, in effect, such construction provides for four separate machines, each of which tests three tires. The tires are mounted vertically and rotate on spiders inside a section of a horizontal stationary cylinder that forms the roadway. Such device is designed to obtain treadwear by lifting the tires periodically with respect to the roadway, and then allowing their peripheral speed to be reduced, after which the tires are brought in contact with the roadway thereby causing the tire to slip until it regains the proper speed. Like the previously discussed testers, the track, according to such construction, would rapidly become gummy with rubber and no longer would simulate a roadway.

The patent to Seidl, Patent No. 2,131,979, is designed to test carcass performance at high speeds and not to test treadwear. In this patent the track is stationary and the tires are rotated on a spider at speeds above 80 miles per hour.

The tire tester described in this application differs from any of the above referred to types of tire testers with respect to the following features all of which form immediate objectives of the present invention:

1. A large rotating vertical cylinder is provided which is power driven relative to the tires and serves as the roadway. The diameter of this cylinder is made large to reduce the curvature of the roadway to a small value.

2. The tires are run in a horizontal position on vertical spindles and are loaded against the roadway by means of adjustable pressure devices which may be automatically controlled.

3. Slippage between the tires and the track is obtained by controlling the cornering in alternate directions so that uniform wear across the tread is obtained.

4. A movable tire mount platform is used to continuously and cyclically traverse the tires across the surface of the roadway to prevent the formation of grooves in the road surface and minimize the effects of gum deposits.

5. A fine abrasive dust is applied to the tires and roadway by pneumatic means. Centrifugal force is used to hold the dust against the vertical roadway. The type of dust is selected to enhance the abrasion process as well as to prevent gumming of the track.

6. The treadwear of a large number of tires can be determined simultaneously under identical simulated conditions of service.

7. A unique electrical and pneumatic system is used to automatically control the conditions of tests and the operation of the tester. The speed, load, and ambient temperature test conditions on the tire can be readily varied while the tires are being tested.

8. The temperature and the pressure of the contained air in the tires can be measured or recorded and the tire pressure can be varied while the tires are running.

9. A sectional roadway surface is provided which is held more firmly to the track as the testing speed is increased by utilizing the centrifugal force developed by the rotating roadway.

10. The rotating roadway is vibro-insulated from the building and other equipment by means of suitable vibration absorbers.

11. A common tire mount is used for testing all commercially available types of tires regardless of size.

The invention is illustrated in the accompanying drawings in which:

Fig. 3 is an enlarged view of a tire testing station taken on line 3—3 of Fig. 2;

Fig. 3a is a detail showing the construction of a special tire valve adaptor employed;

Fig. 4 is an enlarged view partly in section of a portion of the tire mount assembly taken on line 4—4 of Fig. 3;

Fig. 5 is a detailed view of the wheel tilting mechanism;

Fig. 8 is a schematic showing the circuit employed to control various elements of the tire tester;

Fig. 10 is a diagrammatic illustration of the pneumatic circuit employed to load the tires under test;

Fig. 11 is a diagrammatic illustration showing in greater detail the control elements for cycling the tire mounting platform shown in Fig. 1; and Fig. 12 is a detail of the abrasive dust applicator.

Figure 1:
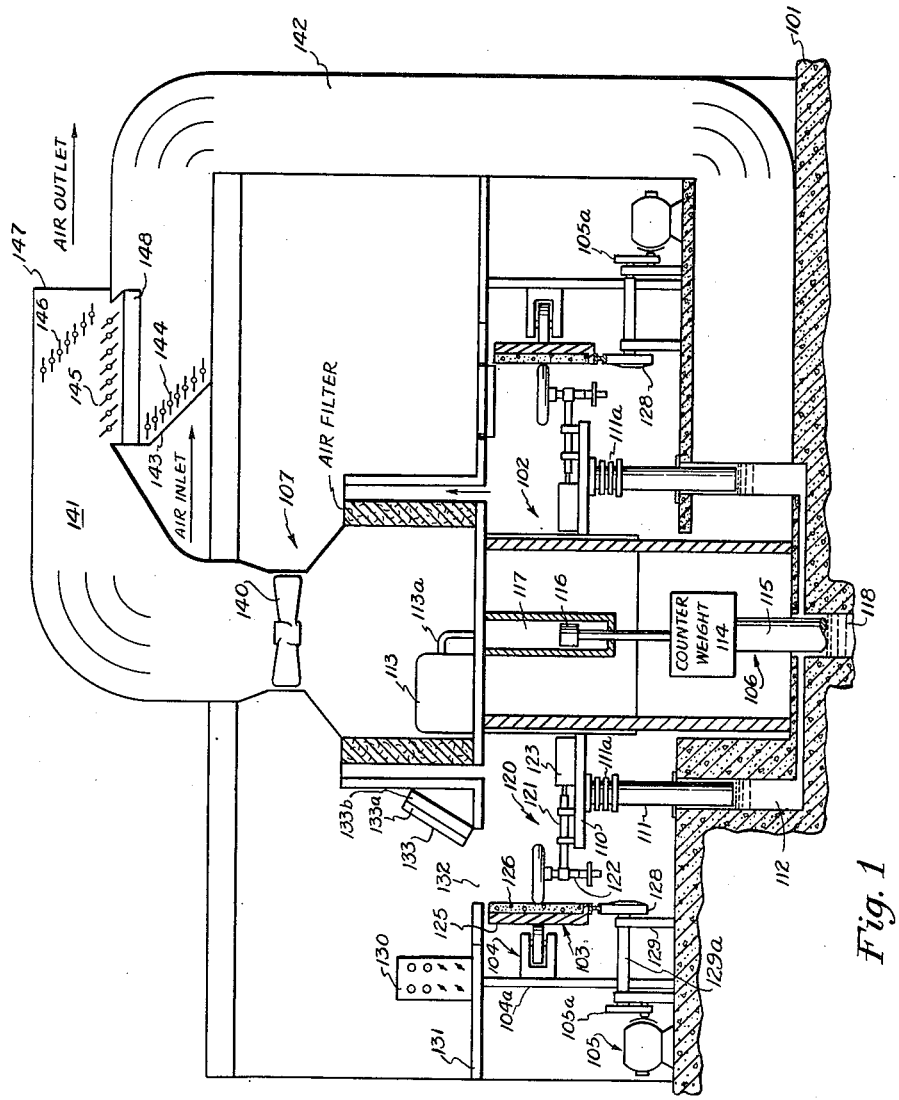
Fig. 1 is a partially diagrammatic pictorial representation of the overall layout of the complete tire testing machine showing the disposition of the ventilating system and the relative positions of the various components.

The overall layout of the tire-testing machine comprising the present invention is illustrated in Fig. 1. The tire tester is large enough to accommodate as many as eighteen of the largest commercial size tires at one time and is therefore necessarily of extremely large proportions. The entire tire-testing machine is mounted on a thick concrete platform 101 to withstand the vibrational stresses which arise during operation of the machine and the entire mechanism is housed in a building or enclosure as shown. The tire tester in general consists of a central platform portion 102, a peripheral track portion 103, a guide roller system 104, a drive roller and motor traction system 105, a hydraulic lift system 106, a circulatory heating and ventilating system 107, and an electrical power and control system 130. The overall construction and functioning of the components will be briefly described in connection with Fig. 1, while the detailed construction of such components and the manner in which they function and cooperate will be fully described in following portions of the specification.

The central platform assembly generally designated as 102 in Fig. 1 comprises the tire mounting stations. The platform comprises a reinforced base plate 110 which is supported for movement in a vertical direction by a plurality of hydraulic plungers 111. The plungers are connected to the platform through vibration insulating connectors 111a, each of which is made of a series of steel plates having rubber sheets interposed therebetween. The hydraulic plungers are contained in a corresponding number of hydraulic cylinders 112 which are filled with oil. The platform 110 is counterbalanced by a large counterweight 114 which is suspended centrally of the platform and is engaged in the hydraulic system by means of a plunger 115 slidably received in a hydraulic chamber 118. At its upper end counterweight 114 carries a hydraulic piston 116 slidably received in a hydraulic cylinder 117 which is suitably fixed to an upper framework 131 of the building. A hydraulic pump 113 is mounted in a suitable position on such framework and supplies oil under pressure through a pressure line 113a to the hydraulic system as will be fully described in connection with Fig. 11.

The tire mount platform 110 provides a plurality of equally spaced tire testing stations 120. Each tire testing station is identical and comprises an arbor 121 which is displaceable radially of the platform by pneumatic cylinder 123 and rotatively with respect to its longitudinal axis by a tilting mechanism to be described. The arbor 121 carries at one end a mandrel 122 having at each end a hub or flange of standard vehicle type to which a tire wheel may be bolted. The mandrel is adapted to receive two different series of tire sizes, one end of the mandrel being adapted to accommodate large vehicle tires such as truck and bus tires while the other end of the mandrel is adapted to accommodate the smaller vehicle tires such as passenger car and light truck tires. The pneumatic cylinder 123 which is connected to an end of the arbor 121 is provided in order to load the tire under test against the roadway generally designated as 103 in Fig. 1. As will appear, the platform 110 together with all tire stations is cyclically reciprocated in a vertical direction so that the tires will periodically traverse the width or height of the roadway 103. A tilting mechanism, to be described is further provided for tilting the arbor 121 to simulate steering movement of the tires under test. The above elements will be described in detail in connection with Fig. 2.

The test roadway or track 103 is revolvable with respect to the stationary tire test stations about a vertical axis corresponding to the position of piston 115 in Fig. 1. The track consists of a large cylindrical weldment 125 which completely encircles all the tire test positions. The track is preferably 1/60 of a mile in circumference to minimize curvature effects. Special means to be described are provided for detachably affixing a selected type of road surface 126 to the weldment. The rotatable roadway 103 is guided in a radial direction by a plurality of spaced guide rollers generally designated as 104 in Fig. 1 affixed to a vertical framework 104a. To support the track in a vertical direction a plurality of rollers 128 rotatably supported in spaced pedestals 129 are provided. Some of these rollers 128 are idlers while others serve as traction wheels to drive the drum 125. To provide the necessary power for driving the test track at speeds which may vary from 22 to 70 M. P. H., a plurality of large electric drive motors 105 are coupled to the traction rollers 128 by a suitable transmission member designated as 105a in Fig. 1. An electrical control board and test panel 130 is conveniently provided on the upper platform 131 of the testing apparatus and symbolizes the electrical control circuit, the power control circuit and the test circuits to be described.

Preferably all testing procedures are carried out by personnel stationed in the area above the upper framework 131 while the described testing mechanism is located in the area included between the foundation 101 and the top framework 131. To provide access and visual observation of each tire test station, a number of openings 132 are provided in the top frame 131 at intervals corresponding to the positions of the tire test stations. Such openings are closed by a double door arrangement 133 comprising a first hinged transparent cover 133a which can be used to close the opening 132 independently of a second hinged door or hatch 133b.

In order to test the tires under given conditions of ambient temperature a large heating and ventilating system is employed. As is evident from Fig. 1 means are provided so that the air may be continuously recirculated through the tire testing portion of the mechanism by means of a large fan blade 140 which forces air through a closed duct arrangement 141, 142 from the top of the tire testing mechanism and back through the bottom of the mechanism. Outside air is available through an air inlet port 143 on the exterior of the building which is controlled by a series of adjustable louvres 144. Air may be discharged to the building exterior through an outlet port 147 which is also controlled by a series of adjustable louvres 146. In addition, the internal circulating air may be controlled by a series of adjustable louvres 145 located adjacent to an internal orifice 148. Suitable heating coils are provided in order to further regulate the temperature of the air.

Figure 2:
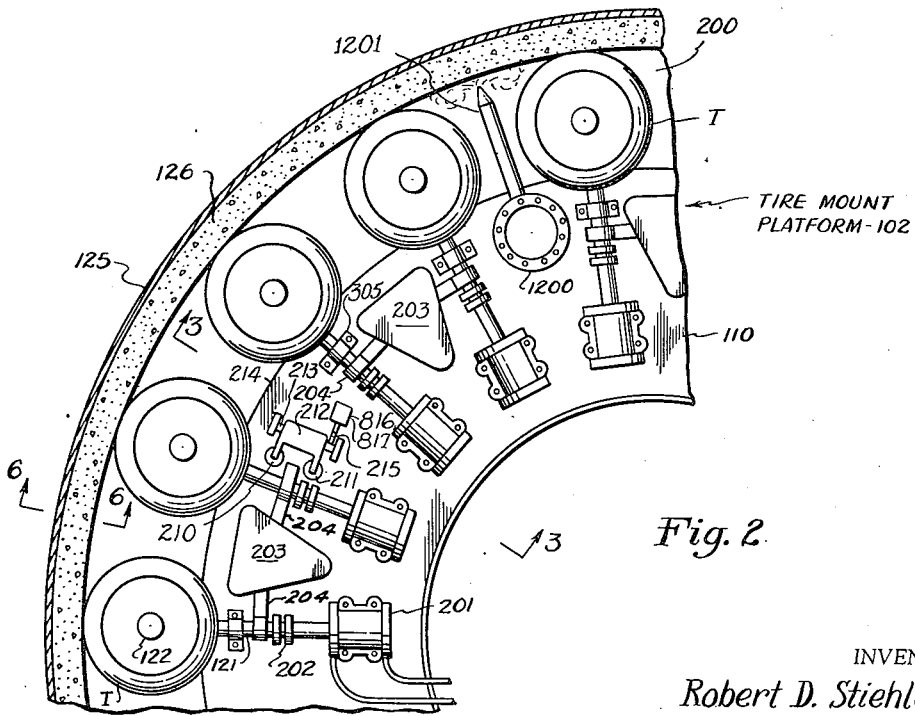
Fig. 2 shows a portion of the tire mounting platform including a representative number of the tire test stations.

Fig. 2 shows in greater detail the construction of the tire mount platform 102. A portion of the annular base plate 110 is shown in Fig. 2, which serves to support a plurality of equally spaced tire testing stations. Each such tire testing station comprises a pneumatic cylinder 201 securely fastened to the base plate 110. The arbor 121 which serves as the tire support is connected to the piston of the pneumatic cylinder 201 by a coupling 202 which permits the arbor 121 to rotate with respect to the piston for a purpose that will be made apparent. The tire to be tested is mounted to rotate about an axis defined by the mandrel 122 perpendicular to the axis of the arbor 121. Air under pressure is applied to the pneumatic cylinders 201, and, by means of a suitable control system it will be apparent that the force with which the tire T is pressed against the surface 126 of the roadway 125 can be selectively varied to simulate the actual distributed load conditions commensurate with the size of the vehicle on which the tire would actually be mounted.

The present invention also contemplates the simulation of the steering or cornering movements of a vehicle wheel and to accomplish such purpose a tilting mechanism 203 is provided coupled to adjacent pairs of tire stations as clearly illustrated in Fig. 2. Specifically, in order to cant each of the vehicle wheels, a crank-arm 204 is fastened medially to each of the arbors 121, as is more clearly shown in Figs. 3 and 5. This tilting mechanism 203 which is detailed in Fig. 5 provides a means for rotating the arbors 121 and thereby tilts the plane of the vehicle tire T about the longitudinal axis defined by arbor 121.

The construction and operation of the tilting mechanism is more clearly shown in Fig. 5 of the drawings. The tilting mechanism comprises a base plate 501 firmly secured to the tire mount platform 110. A plurality of guide rods 502 are provided in upstanding relation to such base plate 501 and a pair of spaced, vertically shiftable guide plates 503—503 are slidably mounted on these guide rods 502. The spaced guide plates 503 are firmly fixed with relation to each other to provide a vertically movable guideway 503a of sufficient width to accommodate the rollers 504 which form an extension of the referred to cranks 204. The guide plates 503 are further secured to a connecting rod 505 which projects down through the base plate 501 and platform 110 as shown in Fig. 5 to the piston of a pneumatic cylinder 506 which is secured to the platform 110 by means of suitable supporting bolts 507. Pneumatic lines 508 and 509 connect opposite ends of the pneumatic cylinder 506 to a 4-way valve 510 which in turn is connected to a source of high pressure air by means of line 511. The relation of the cranks 204 to the arbors 121 are clearly detailed in Fig. 5 and it will be apparent that the connecting rod 505 can be selectively reciprocated in a vertical direction by manipulating the control valve 510 through a control circuit to be described in connection with Fig. 8. Reciprocation of the connecting rod 505 causes translation of the guide plates 503 in a vertical direction along the guide rods 502, to oscillate the cranks 204 and the arbors 121 which pivot the vehicle wheels T (Fig. 2) in simulation of the steering movements of a vehicle. The top plate 512 completes the assembly of the tilting mechanism 203 and a pair of suitable adjustable stops 513, 514 are provided to limit the vertical movement of the guide plates 503.

By reference to Fig. 2, it will be apparent that the arbors 121 may be required to undergo axial displacement concurrent with the referred to oscillatory movement. Since the connection between the cranks 204 and the guide plates 503 as clearly shown in Fig. 5 is through the rolling contact provided by the rollers 504, and the referred to guideways 503a, it will be apparent that sufficient lost motion is provided to permit such compound movement of the arbor 121.

Summarizing the construction so far described, it will be apparent that the tires to be tested are rotatably mounted with respect to the roadway 125 by mandrel 122, that actual loading conditions on the tire can be simulated by virtue of the pressure exerted by the pneumatic cylinder 201 on the arbor 121, and that steering movements of the vehicle tire can be duplicated by means of the tilting mechanisms 203 and the crank arm 204.

Each of the referred to tire test stations comprises a construction which facilitates varying the test conditions of the tire while the tire is being tested together with means for facilitating measuring the physical conditions within the tire during such tests. The construction of each tire station is specifically detailed in Figs. 3 and 4. Fig. 3 shows the arrangement of the tire test station including the physical arrangement of the arbor 121, the pneumatic cylinder 201, the coupling 202, the mandrel 122 and the main platform 110. The mandrel 122 which carries the tire mounting hubs 301 and 302 is arranged perpendicularly with respect to arbor 121, and, by virtue of the rotatable coupling 202, mandrel 122 may be easily indexed into either one of two 180-degree positions. As shown in Fig. 1, the upper position of the mandrel 122 is employed as the testing position of the vehicle tire. However, in order to accommodate both small and large size tires, different types of wheel mounts 302 and 301 must necessarily be provided. To place the tire in test position the mandrel 122 is indexed so the tire under test is in its upper position as shown in Fig. 1. To facilitate such indexing of mandrel 122, a pair of clamping bolts 321 circumferentially spaced at 180 degrees are provided in the crank 204 as shown in Fig. 3. These bolts cooperate with a pair of like spaced indentations provided in the surface of the arbor 121. By loosening the bolts 321, the tire to be tested, whether mounted on either of the hubs 301 or 302 may be placed in the upper testing position after which the bolts are refastened. A pair of pillow block bearings 304 and 305 are firmly secured to the base plate 110 in order to support the arbor 121.

The construction of the mandrel 122 is more fully detailed in Fig. 4. The mandrel 122 as shown in Fig. 4 comprises an elongated hollow shaft, the interior bore of which accommodates an inner sleeve 401 which extends through the length of the hollow shaft. The inner sleeve 401 in turn has an axial bore 402 which is pipe threaded at opposite ends to receive a rotating pressure joint 403 of a type commercially identified as a Schrader pressure joint, Catalogue No. 9361. The rotating joint 403, adjacent to the particular flange on which a test tire has been mounted, is connected, as shown in Fig. 3, by means of a flexible hose 403a to the tire valve 313 through a special adaptor 310.

The construction of adaptor 310 is detailed in Fig. 3a and is shown as comprising a sleeve, one end of which is internally threaded so that it can be screwed on the standard inner tube valve stem 313 from which the valve core has been removed. An auxiliary valve stem 311 is fitted to the sleeve and the air hose 403a is connected thereto. Auxiliary valve stem 311 may be fitted with a standard valve core if the tire is to be run without control or measurement of its pressure. Preferably, the valve core is omitted so that the internal tire pressure can be varied at will by using conventional manual throttling valves in the air supply system. The interior of the tube 313 provides a passage for the air applied by the hose 403a and also accommodates a pair of leads 314 connected to a thermocouple temperature measuring device 315 placed internally of the tire (Fig. 3). The leads 314 terminate in a pair of contacts 314a which extend through an insulated end wall 311a of the adaptor. A pair of conductors 315a are secured to the outer ends of the contacts 314a and are provided with a Jones type plug 316 adapted to be connected with a receptable 408 provided in the hub 301 for a purpose to be described. As shown in Fig. 4, a portion of the inner sleeve 401 of the mandrel is recessed and is provided with an insulating collar 404 which is firmly secured to the sleeve 401 by a set screw or other fastening 405. A pair of conducting slip rings 406, 408 are firmly secured to such insulating sleeve as shown in Fig. 4 to which conductors 407 are electrically connected. The conductors 407 are then led through the annular space existing between the inner sleeve 401 and the inner diameter of mandrel 122, to the referred to Jones type electrical connector 408 situated exteriorly of the mandrel on the hub 301. Electrical brushes 409 of conventional construction are provided for the purpose of making electrical contact between the slip rings and an external circuit which preferably comprises an automatic temperature recorder 420.

The thermocouple 315 is shown in position within the test tire in Fig. 3. The conductors 315 shown in Fig. 3 consist of a first copper lead and a second constantan conductor as is conventional in heat measurement circuits. The conductors 407 shown in Fig. 4 are similarly constructed and, when joined with the conductors 315 through the plug 316 and receptacle 408 as shown in Fig. 4 comprises a constantan copper connecting circuit between the thermocouple and the slip rings 406, 408. Since the slip rings are made of copper, it is necessary to compensate the temperature measuring circuit so that the remaining portion of the circuit will not also act as a temperature measuring circuit. A fixed ring 421 is therefore secured in the interior bore of mandrel 122 by a set screw fastener 424. The fixed ring is provided with a circumferential groove 421a for the purpose of anchoring the conductor leads 422, 423. The lead 423 is made of constantan and connects the temperature recorder 420 to the fixed ring 421. The lead 422 is made of copper and joins the fixed ring 421 to the slip ring 406 through brush 409. The connections 422, 423 and ring 421 thereby provide a compensating junction to preclude erroneous temperature measurements which might originate in the portion of the circuit leading to the temperature recorder.

The inner sleeve 401 is connected at one end to the referred to tire mounting hub 301 through an end plate 421 to which it is welded. The hub 301 includes a flange 415 provided with a plurality of lugs 417 of standard automotive type for mounting the tire wheel. Such flange is welded to a hub member 410 which forms the outer housing of a tapered roller bearing arrangement 411, 412. The opposite hub 302 is similarly constructed but is of smaller size.

It follows from the construction described in connection with Fig. 4 that each of the hubs 301, 302, together with inner sleeve 401 is rotatably mounted by means of the roller bearings 411, 412, on the mandrel 122 and that the air couplers 403—403 together with electrical receptacle 408 will rotate therewith together with the tire under test.

The mandrel 122 is secured to the arbor 121 by means of a knuckle 415. Since the arbor 121 may be rotated in the bearings 304, 305 because of the described rotatable connection 202 (Fig. 3), either of the hubs 301 or 302 may be indexed to the upper tire testing position shown in Fig. 1 by means of the clamping bolts 321 provided in the crank arm 204 (Fig. 3).

Summarizing the operation of a tire station, it will be apparent that the tire assembled on a standard vehicle wheel may be bolted to either of the hubs 301 or 302. Fig. 3 shows such test tire T mounted on hub 302. The special T fitting 310 shown in Fig. 3a is applied to the valve stem and the air hose 403a is connected between the valve 313 and the rotatable air coupler 403. The thermocouple 315 is also positioned in the interior of the tire and the connecting wires 315 are plugged into receptacle 408. From Fig. 4 it will be apparent that the tire tube is now connected by a passageway comprising fitting 310, hose 403a, coupling 403, the interior bore of inner sleeve 401 to the opposite rotatable air coupler 403. Such coupler is connected to a separate source of high pressure air so that the tire pressure may be optionally varied.

The thermocouple is connected through receptacle 408 and leads 407 interiorly of the arbor 122 to the slip rings 406, 408 and thence to the recording thermometer 420 as described. Thus the tire under test may rotate at any desired speed and the internal pressure may be controlled at any time by adjusting the air pressure applied at the free end of the mandrel through coupler 403. The internal temperature of the tire may also be continuously recorded while the tire is rotating because of the described slip ring connection between the recorder 420 and thermocouple 315. In addition, the load conditions on the tire may also be continuously varied while the tire is under test by regulating the pressure applied to air cylinder 201.

*The roadway 103 (Fig. 6)*

Figure 6:
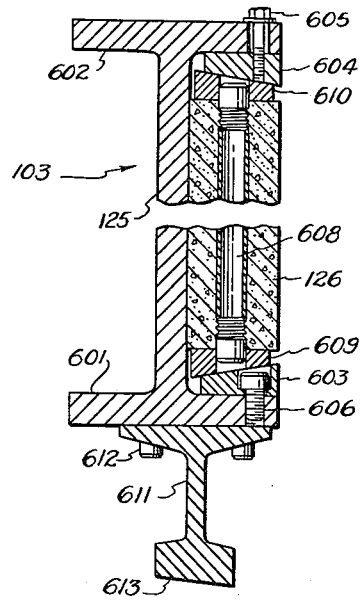
Fig. 6 is a partial sectional view showing the construction of the test roadway as taken on line 6—6 of Fig. 2.

The roadway generally designated by reference numeral 103 in Fig. 1 is detailed in Fig. 6. The roadway consists of a large annular weldment which completely encircles the central tire platform 102 as shown in Fig. 1. The weldment comprises an annular cylindrical web 125 which is approximately 3½ feet high and 1/60 of a mile in circumference in order to provide an adequate road surface area for testing the tires. The web 125 is securely welded to a lower flange 601 and an upper flange 602. The inner face of the annular roadway is adapted to detachably receive sectional components of road surface material. These components are applied to the annular roadway as facings designated by reference numeral 126 in Fig. 6. Since such facings are made in easily manipulable sections, any desired type of roadway may easily be simulated merely by making up the sections according to the surface desired, whether it be concrete, macadam or blacktop or if desired any other material which determines the conditions of tire tests. Preferably these facings include a center core portion 608 comprising steel tubes which extend vertically through each section. In order to affix the facings to the annular roadway, a plurality of wedge members 604, 610, 603, and 609 are provided. The wedge members 610 and 609 are fixed to the upper and lower ends of each of the roadway inserts 126 by means of the extensions on the central core member 608. The wedge member 603 is permanently secured to flange 601 by means of clamping bolts 606. The wedges 604 may then be adjustably clamped to each of the referred to flange 602. It is therefore merely necessary to release the clamping bolt 605 and wedge 604 in order to place any desired type of roadway insert into the roadway mount. An annular steel rail 611 is fixed to the lower surface of flange 601 extending circumferentially around the annular track. It will be noted that the lower tread portion 613 of rail 611 is tapered to define a conical surface, the axis of which coincides with the center of rotation of the roadway.

Figure 7:
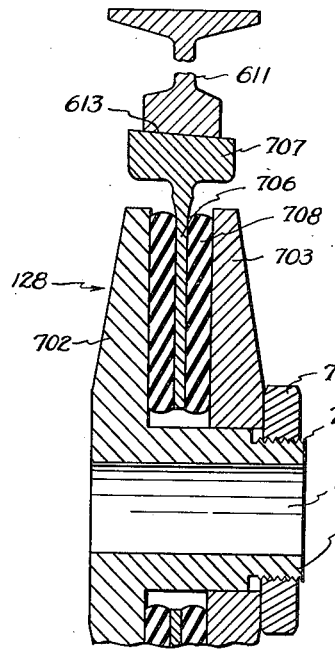
Fig. 7 is an enlarged detail showing the construction of the traction wheels for supporting and driving the roadway.

The traction wheel is designed to provide a vibration insulating connection between the rotatable trackway and the foundation support for the tire tester. It consists of a central hub 700 having a bore 701 to accommodate a drive shaft which is subsequently coupled to the drive motors 105 (Fig. 1). The drive wheel further includes a fixed flange 702 and an adjustable flange 703 between which the tread portion 707 of the drive wheel is sandwiched. The tread includes a disk portion 706 which is floatingly carried by a pair of soft rubber washers 708. A large clamping nut 704 cooperating with a threaded portion 705 on the hub 700 enables the wheel tread 707 to be firmly clamped to the hub 700 against the fixed flange 702. The referred to rail 611 described in connection with Fig. 6 is shown in the position it occupies with relation to the driving wheel in Fig. 7. It will be noted that the taper 613 cooperates with a complementary taper on the periphery of the tread 707 on the drive wheel and both tapers define the conical surfaces having a common apex.

Motivating means are provided to drive the roadway at selectively variable speeds corresponding to linear speeds as high as 70 M. P. H. As noted in connection with Fig. 1 a series of traction motors 105 are mounted on the foundation peripherally of the circular roadway 103. Each of the motors is connected to a traction wheel 128 through a transmission 105a and a stub shaft 129a. The power circuit for energizing the motivating means is detailed in Fig. 9.

Figure 9:
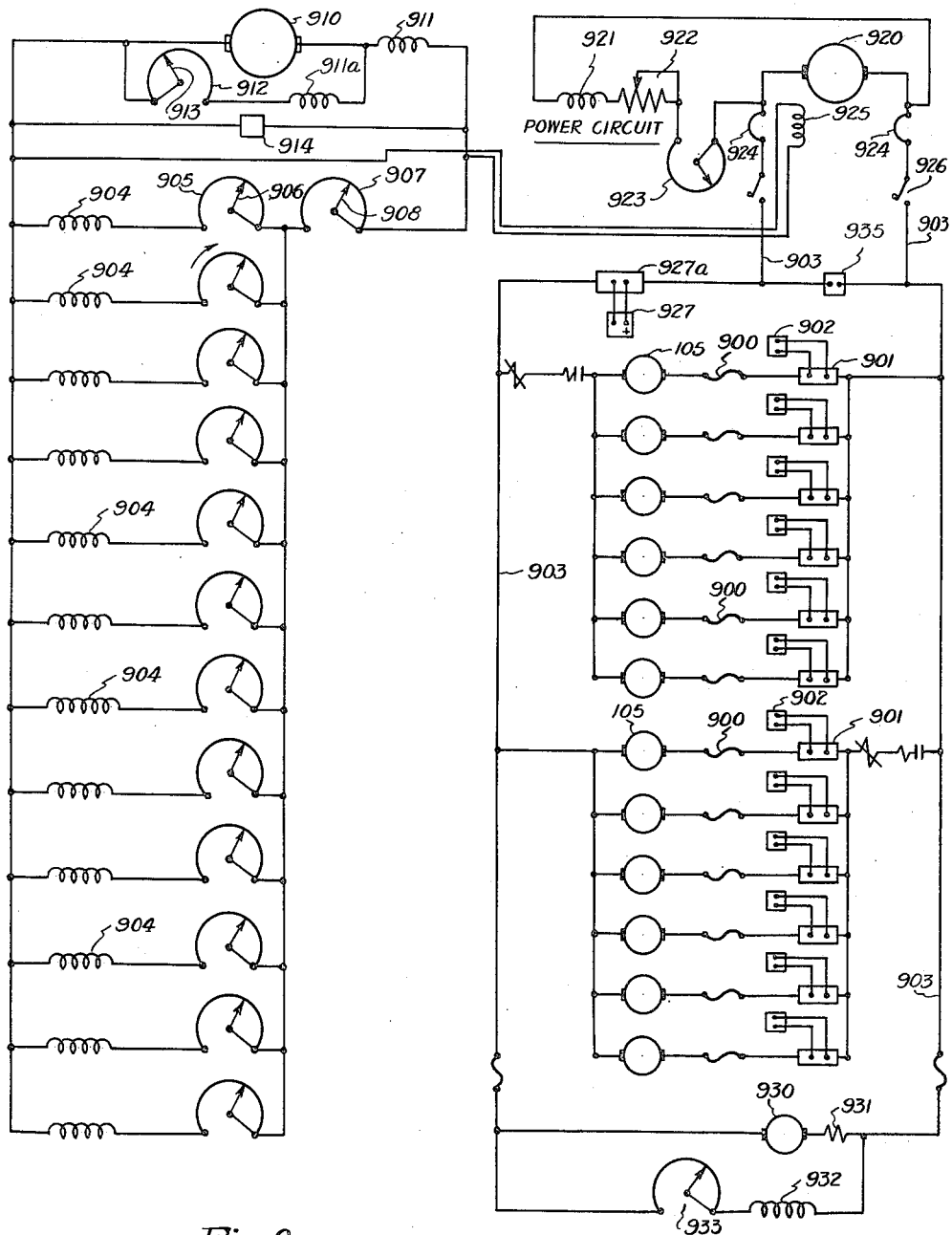
Fig. 9 is a schematic diagram of the power and motor control circuits employed.

Power circuit (Fig. 9)

The roadway assembly 125 is driven by 12 twenty-horsepower direct-current motors. The armatures of such motors are designated by reference numeral 105 in Fig. 9 which shows the motor control circuit as well as circuits for providing auxiliary power to the remaining portions of the tire testing mechanism. As shown in Fig. 9 the drive motors 105 are arranged in groups of six and such groups are paralleled to the supply main 903. A circuit breaker device 900 is placed in series with each of the motor armatures and each armature is further connected through a shunt 901 to an ammeter 902 so that the armature current through each motor armature 105 can be independently observed. The field of each motor 105 is indicated by reference numeral 904 in Fig. 9, and, as shown, each motor field is separately connected to a vernier control rheostat 905 which has a manually adjustable wiper-arm 906. All twelve of the field windings 904 are paralleled together, as is shown in Fig. 9, and are connected to a main field control rheostat 907.

The purpose of such described arrangement of the motor control circuit is to enable adjustments of each of the drive motors 105 so that they will individually share the load equally. The main field rheostat 907 gives an approximate adjustment of all the motors to a desired speed, and then the vernier rheostats 905 are individually adjusted by observing the readings of the ammeters 902 which are provided individually to each motor, until all motors draw the same amount of current.

Field excitation for the fields 904 is obtained from a 15-kw. 250-volt exciter 910, the field of which is shown in 911. A rheostat 912 is provided to control the output of a field excitation circuit, the field current being variable by means of the adjustable arm 913. The field current is adjusted by aid of the voltmeter 914 which is connected across the exciter as shown in Fig. 9.

Power for the supply mains 903 is obtained from a main 400 kilowatt generator 920 which is driven by a suitable motor, not shown. The main generator is provided with a shunt field 921, which is adjustable by means of a variable rheostat 922 and a vernier control rheostat 923. A pair of circuit breakers 924, 924 including circuit contacts 926, 926, and an overload sensing coil 925 is provided to supply the power generated by the main generator to the mains 903. An ammeter indicated at 927 is connected in the main supply main 903 by means of a suitable shunt 927a, and a voltmeter across the main is indicated at 935. The drive motor for the ventilating fan 140, shown in Fig. 1, is indicated at 930 of Fig. 9 and is shown as being connected across the mains 903. The fan motor also includes an armature field 931 and a shunt field 932 provided with a suitable control 933 for regulating its speed.

Tire mount reciprocating mechanism

Referring again to Fig. 1, it will be apparent that if the roadway 103 were fixed with respect to the path of the vehicle tire under test, a groove would be worn in the roadway surface 126, and the deposit of rubber from the tire tread on such portion of the surface would form a glaze which would quickly obviate the purpose of the test, namely, to test the durability of a tire under a particular road surface condition. To minimize such deleterious effects, an arrangement is provided whereby the tire-mount platform 102 is cyclically reciprocated completely across the width of the roadway 126 periodically as the roadway rotates. Thus all portions of the roadway 126 are subject to even wear, and the above referred to detrimental conditions are clearly avoided.

To provide such reciprocating movement of the tire test stations, the previously described hydraulic system comprising the supporting pistons 111 and the hydraulic chambers 112 are employed. The platform 110 is carefully counterweighted by a large weight 114 centrally situated with respect to the platform assembly 102. The counterweight 114 is hydraulically coupled to counterbalance the mass of the platform 102 through a piston 115 and hydraulic cylinder 118. The weight of the platform assembly 102 is transmitted through the pistons 111 to the cylinders 112 while the weight of the counterweight is coupled to the same hydraulic system through the piston 115 and the cylinder 118. To elevate and depress the platform assembly 102, a driving piston 116 within a cylinder 117 which is fixed to the framework 131 is provided and a hydraulic pumping unit 113 is coupled to the cylinder 117 by a pressure line 113a. The particular hydraulic and control system will be fully described in connection with Fig. 11. Reciprocative movements of the platform assembly 102 is automatically provided in a cyclical manner by means of a cam linkage to be described and a control circuit which is physically located in the control cabinet 130 in Fig. 1 and is diagrammatically shown in Fig. 8.

Control circuit (Fig. 8)

The purpose of the control circuit shown in Fig. 8 is to (1) control the cycling of the tire mount platform 110 through its vertical reciprocating path traversing the rotatable roadway 125; (2) to control the loading to the pneumatic cylinders 123 which determine the pressure with which the tires under test are applied against the roadway 125 in simulation of the actual weight of the vehicle in connection with which the tire is intended to be used; and (3) to control the cycling of the tilting mechanism 203 to simulate steering movements of the vehicle. Fig. 8 details the circuitry involved in accomplishing such enumerated control functions.

Tire mount cycle control

The pumping unit 113, shown in Fig. 1, which provides the hydraulic drive employed to reciprocate the platform assembly 102 in a cyclical manner and in a vertical direction with respect to the roadway 103 is driven by a 3-phase three-quarter horsepower motor, the armature 800 of which is shown in Fig. 8. The motor is connected by a three-conductor line 801 to a standard type of three-phase magnetic starter box 803, having an optional manual disconnect, as shown. The starter box in turn is connected to an external source of power by means of the cable 804. The manner in which the control circuit of Fig. 8 is effective to govern the cycling of the tire mount platform 110 is apparent from a consideration of Fig. 11 which shows in diagrammatic fashion the articulation between the drive pump 113 and the tire mount platform 110. The pertinent portions of the hydraulic system are indicated in Fig. 11 as comprising the piston 111 which serve to elevate and depress the tire mount platform 110, a portion of which is shown in Fig. 11. The piston 111 is shown in the position it occupies in the hydraulic chamber 112, which is connected to the hydraulic well 118 by means of a port 112a. The actuating piston 115 which cooperates with the well 118 and the counterweight 114 is connected to the drive piston 116, reciprocably mounted in the hydraulic cylinder 117. A four-way valve 1100 is connected to the output of the pumping unit 113 identified in connection with Fig. 1. The valve is connected to the lower and upper ends of the cylinder 117 by means of pressure lines 1102 and 1103 respectively, while a third exhaust line 1104 is connected to a sump (not shown), from which the pumping unit gets its oil supply. As indicated in Fig. 11, the valve is connected to the armature of a pair of solenoid coils 802 and 803, which are also illustrated in the control circuit of Fig. 8. Coil 803 is designated as the "up" solenoid coil, while coil 802 is designated as the "down" solenoid coil. It is thereby apparent from Fig. 11 that energization of the up solenoid coil 803 results in positioning of the valve 1100 so that the hydraulic pressure obtained from the pumping unit 113 will be applied through line 1103 to the upper end of cylinder 117 thereby causing depression of the piston 115 and consequent raising of the tire mount platform 110. Conversely, energization of the down solenoid 802 will position the valve 1100 so that the pressure from the pumping unit 113 will be applied to the lower end of cylinder 117, which will move the piston 115 in a direction which will tend to depress the platform 110. A gauge rod 1105 is secured to the platform 110. The gauge rod has fixed thereto an upper cam 1106 and lower cam 1107. The cams 1106 and 1107 are respectively cooperable with a limiting switch 806 which is more particularly detailed in Fig. 8. As the platform 110 shown in connection with Fig. 11 approaches its lower extremity of travel the cam 1106 will actuate the switch 806 in one direction while when the platform is elevated to its extreme upper position the cam 1107 will actuate the limit switch 806 in an opposite direction.

As shown in Fig. 8 the referred to up and down solenoid coils 803 and 802 are electrically connected to such limit switch 806. Thus the action of the referred to cam 1107 is to close the contacts labeled 805 in Fig. 8 and thus energize the down solenoid 802. Conversely, when the platform 110 has reached its lower extremity the cam 1106 will be effective to close the contacts 804 to energize the up solenoid 803 which, as is evident from the described operation of Fig. 11 will cause elevation of the platform. In such manner the tire mount platform 110 is caused to cycle repetitively in a vertical direction to thereby transport the tires under test transversely of the roadway 125.

*Control of the tire tilt mechanism*

The second function of the control circuit shown in Fig. 8 is to control the tilting mechanism which simulates the steering movement of the vehicle tires under test. Referring briefly to Fig. 5, the multiple valve 510 which controls energization of the pneumatic cylinder 506, is solenoid-operated by means of the solenoid coil 810 shown in Fig. 8. A single solenoid is employed in this instance, since return movement of the valve, after displacement by energization of the solenoid 810, is preferably obtained by means of a spring (not shown). In order to obtain cyclical control of the tilting mechanism, a conventional motor-driven timer comprising a motor-driven cam 808 and a follow-up switch 809 in circuit with the solenoid 810 is employed. As the cam 808 rotates to periodically open and close the switch 809, the solenoid 810 is repeatedly energized and thereby periodically actuates the referred to valve 510, shown in Fig. 5. In this manner the cylinder 506 is periodically operated to repeatedly raise and lower the guide plates 503 and thereby cyclicly impart steering movements to the vehicle tires under test.

*Tire loading control*

It has been pointed out that the present invention provides means for simulating the actual loading conditions on a tire as would be occasioned by the weight and load distribution of a vehicle. As was described in connection with Figs. 1 and 2, the pneumatic cylinders 123 may be selectively energized to force the arbors 121 and the tires against the internal surface of the roadway to simulate any desired load condition.

Preferably, opposed pairs of the cylinders 123 are paralleled to a pressure source through a pneumatic control circuit of the type diagrammatically shown in Fig. 10. A pair of the cylinders 123 are shown connected in parallel to a four-way valve 1000. A source of high pressure air 1001 is applied to the control system through a throttle valve 1002. Suitable filters 1003 and a reducer 1004 are employed to connect the air supply to an automatic recording type of pressure regulator control 1005. Such pressure control is a commercially available type such as the Bristol Dynamaster and includes an adjustable pointer for selecting any desired pressure indicated on the scale 1005b. A recording member 1005c provides a convenient means for keeping a record of pressures. The referred to control maintains constant regulation of the pressure applied to the cylinders 123 from the inlet 1001 through a sensing device including control valve 1007 and the Bourdon transducers 1010. That is, the pressure of the portion of the main supply of air which is fed to the cylinders 123 through line 1006 is converted to electrical signals by the transducer head 1010 and applied to the electronic control circuit contained in control 1005 through the contacts labeled 1, 2 and 3. The circuit 1005 in turn adjusts the control valve 1007 through diaphragm 1009 to maintain the air pressure in line 1011 at the level selected by the adjustment of pointer 1005a.

Each of the multiplicity of valves 1000 may be energized in order to operate any desired pair of pneumatic cylinders 123 in accordance with a desired loading condition as determined by the setting of control box 1005. Each such valve 1000 is connected to the armature of a pair of solenoid coils 814 and 815 which are illustrated in the control circuit of Fig. 8. Run switch 812 and stop switch 813 comprise one pair of a multiplicity of pairs of like switches which control the actuation of the solenoids 815 and 814 respectively.

*Tire failure stop*

Inasmuch as a plurality of tires may be undergoing tests at the same time, it is necessary to provide means for removing a tire from contact with the roadway in the event one or more of the tires suffers a failure such as a blowout or a blister. As will be apparent by reference to Fig. 2, a tire blowout will cause an axial displacement of an arbor in the direction of the road surface while the development of a blister on the tire will shift the arbor axially in an opposite direction. The manifestation of such displacement is employed to actuate the switches 816, 817 shown in Fig. 8.

As shown in Fig. 2, a tire failure detection device is disposed adjacent each tilting mechanism. Only one such device is detailed in Fig. 2 for purpose of clarity. Each such device comprises a pivoted arm 212 rockably mounted on a shaft 213. The shaft is keyed to the arm 212 and is rotatably supported on spaced bearings 214 mounted on the test platform adjacent the tilting mechanism. The arm 212 is provided with a pair of spaced fingers each of which carries a cam roller 210, 211. The detection device is physically located so that the rollers straddle the crank arm 204. As is more clearly shown in Fig. 5, an arm 215 is fixed to the shaft 213 and is adapted to actuate a switch designated as 816. The relation of the switch to the power circuit is shown in Fig. 8.

The spacing between the rollers 210 and 211 (see Fig. 2) is such as to be clear of the crank 214 when arbor 121 is axially shifted during normal operation of the tire tester. When, however, the tire under test is loaded against the roadway it will be apparent that crank 214 is adjacent the forward cam roller 210. Should a blowout occur, the loading force which is continuously exerted on the tire will cause a further axial displacement of arbor 121 in the direction of the roadway causing the crank 214 to contact roller 210 and rock the arm 212. As is apparent in Fig. 5, such rocking of the arm 212 will cause switch arm 215 to actuate the normally closed limit switches designated as 816, 817 in Fig. 8. The operation of such switch energizes solenoid 814 which thereby actuates the referred to valve 1000 (Fig. 10) in such a manner that the air flow to the cylinders 123 associated with the defective tire will cause the arbors 121 to be drawn away from the roadway.

Similarly, should a protuberance such as a blister occur on the tire, the resultant inward axial displacement of arbor 121 will cause contact between crank 214 and the inner cam roller 211 to similarly actuate the detection device and withdraw the defective tire from contact with the roadway.

In order to log the total time in which a particular pair of tires is under test, a standard timing meter 811 is provided in the control circuit of Fig. 8. The timing meter is energized when solenoid 815 is energized and consequently runs at a rate proportional to the time during which the tire is tested.

Referring to Fig. 11, a portion of the regulated air from line 1011 is bled off through line 1012 and a throttle 1013 to supply air to the dust distributor of Fig. 12.

Fig. 2 shows the arrangement of the dust applicator 1200 in relation to the tire tester. One or more of such dispensers are mounted on platform 110 at convenient intervals as detailed in Fig. 2. The dust dispenser is illustrated in Fig. 12 and comprises a container 1200 provided with a removable cover 1202 fitted to the top opening by means of a sealing gasket 1203. An air inlet connection 1204 is provided adjacent the lower end of the container and an outlet nozzle 1201 is connected to a central conduit 1205 having a lower bell-shaped mouth 1205a which registers with the lower tapered portion of the container to form an annular passageway 1206 between the air inlet 1204 and the storage chamber 1207. Chamber 1207 is filled with a suitable abrasive material such as aluminum oxide powder.

The air inlet 1204 shown in Fig. 12 is connected to the bleeder 1013 shown in Fig. 10 and the air is blown through the annular passage 1206 to the top surface of the filling material, agitating the dust and forcing it through the bell-shaped end 1206, through conduit 1205 and out through nozzle 1201 which sprays dust against the inner surface of the revolving roadway. The dust is evenly distributed across the roadway as the platform 110 reciprocates in the described manner. The application of such abrasive material which may be of 7 micron size, minimizes the gumming of the roadway and also simulates the abrasive action occasioned by dust particles encountered under actual driving conditions.

The described construction enables the efficacious testing of tires under all the conditions of wear that are normally encountered during actual service. Moreover, no material factors need be ignored in testing the tires since means are provided for varying the tire pressure as desired as well as selecting the loading applied to the tire during the test. The tires may be tested at any optional roadway speed and for any desired roadway surface. Moreover, cornering effects are easily simulated by virtue of the tilting mechanism. In addition, the ambient temperature can be controlled to close limits and the internal temperature of the tire is continuously under observation.

Various embodiments of this invention may be made without departing from the basic concept as defined in the following claims.

What is claimed is:

1. A tire testing apparatus for testing vehicle tires under simulated service conditions of load, tire pressure, road surface, speed and cornering comprising, a tire mount platform providing a plurality of tire test stations, each tire test station including means for supporting a tire for rotation in a plane parallel to the plane of said platform, a cylindrical roadway encircling said tire test stations, means for rotatably supporting said roadway whereby the cylindrical surface is at all times perpendicular to the plane of said platform, means for rotating said roadway relative to said tire test stations at selectively variable speeds, means for loading the tires against the roadway, and means for displacing said tire supporting means relative to said roadway in a plane transverse to said plane of rotation, said displacing means including means for maintaining said plane of rotation perpendicular to said roadway surface.

2. A tire testing apparatus in accordance with the construction defined in claim 1 in which said displacing means includes a control mechanism for cyclically producing said relative displacement between said tire support and said roadway.

3. A tire testing apparatus in accordance with the construction defined in claim 1 in which said tire supporting means includes means for canting the tire in a direction relative to the plane of said platform, the said plane of rotation being maintained perpendicular to said roadway surface.

4. A tire testing apparatus in accordance with the construction defined in claim 1 in which the means for rotatably supporting the tires under test includes means for selectively varying the tire pressure while the tire is rotating.

5. A tire testing apparatus in accordance with the construction defined in claim 1 in which said tire supporting means includes means for continuously measuring the internal temperature of the tire while it is rotating.

6. A tire testing apparatus for testing vehicle tires under simulated service conditions of load, tire pressure, road surface, speed and cornering comprising, a tire mount platform providing a plurality of tire test stations, each tire test station including means for supporting a tire for rotation in a plane parallel to the plane of said platform, a cylindrical roadway encircling said tire test stations, means for rotatably supporting said roadway whereby the cylindrical surface is at all times perpendicular to the plane of said platform, means for rotating said roadway relative to said tire test stations at selectively variable speeds, means for loading the tires against the roadway, and means for displacing said tire mount platform relative to said roadway in a plane transverse to said cylindrical surface.

7. A tire testing apparatus according to claim 6 in which said platform displacing means comprises a power drive and means are provided for automatically controlling the power drive to cyclically displace said platform relative to said cylindrical surface.

8. A tire testing apparatus according to claim 7 in which said power drive comprises a hydraulic system including a driving piston and a counterweight hydraulically coupled to said platform, a pump for applying a differential force to said hydraulic system, a multiple position reversing valve connecting said pump to said driving piston to cause reciprocative movement of said piston and means for periodically actuating said reversing valve.

9. A tire testing apparatus according to claim 8 in which said hydraulic coupling system includes at least one lifting plunger secured to the platform and vibration isolating means coupling said plunger to said platform.

10. A tire testing apparatus in accordance with claim 6 in which said means for loading the tires against the roadway comprises a pneumatic system including a source of pneumatic pressure, a selective pressure regulating device and means under control of said pressure regulating device for applying said tires against the roadway.

11. In a tire testing apparatus of the type described, a tire mount platform providing a plurality of tire test stations, each tire testing station comprising a first axial supporting means mounted on said platform, means for rotating and displacing said first supporting means relative to its axis, a second supporting means attached to said first supporting means and extending transverse thereto and means on said second supporting means for rotatably mounting a tire to be tested in a plane of rotation which is parallel to that of the platform.

12. In a tire testing apparatus of the type described, a tire mount platform providing a plurality of tire testing stations, each tire testing station comprising an arbor, means rotatably and slidably mounting said arbor on said platform, means affixed to one end of the arbor for rotatably mounting a tire, and power means for sliding and rotating said arbor relative to said platform.

13. A construction in accordance with claim 12 in which said means for rotating said arbor comprises a tilting mechanism mounted on the platform adjacent the arbor, said tilting mechanism comprising a movable guiding means, power means for cyclically displacing said guiding means relative to said platform, and means connected to said arbor and freely carried by said guiding means to transmit the motion of displacement of said guiding to said arbor.

14. A construction in accordance with claim 12 in which said means for rotatably mounting a tire comprises a mandrel extending transverse to said arbor, a tire mounting hub rotatably mounted on said mandrel, electric test circuit is mounted on said rotatable means and connected to the tire under test and means for electrically coupling said test circuit to an external measuring device.

15. A construction in accordance with claim 12 in which said means for rotatably mounting a tire comprises a mandrel extending transversely to said arbor, a tire mounting hub rotatably mounted on said mandrel, an air passageway in said mandrel, means for coupling said air passageway to the valve stem of the tire under test comprising a chamber having a first portion connectable with the valve stem of the tire under test, a second portion having means connected to said air passageway and communicating with said first portion and a third portion having a sealed wall, electrical contacts extending through said wall, test circuit conductors connected to said contacts and extending outwardly from said chamber through said first portion, an external source of air under pressure and a rotatable pressure joint connecting said air source to said air passageway.

16. A tire testing apparatus for testing vehicle tires under simulated service conditions of load and tire pressure comprising a plurality of tire test stations, each tire test station including means for supporting a tire for rotation, a cylindrical roadway encircling said tire test stations, means for rotating said roadway relative to said tire test stations at selectively variable speeds, each of said tire test stations including means for individually loading the tires against the roadway and tire failure detecting means associated with each test station for deenergizing said loading means.

17. A tire testing apparatus for testing vehicles under simulated service conditions of load and tire pressure comprising, a plurality of tire test stations, a cylindrical roadway encircling said tire test stations, means for rotating said roadway relative to said tire test stations at selectively variable speeds, each of said tire test stations comprising means for supporting a tire for rotation relative to said roadway, means for displacing said supporting means relative to said roadway, to load the tire against the roadway, tire failure detecting means associated with each of said test stations and means coupling said detecting means to said displacing means for withdrawing a defective tire from engagement with said roadway upon occurrence of a tire failure.

References Cited in the file of this patent
UNITED STATES PATENTS

| | | |
|---|---|---|
| 1,638,111 | Coffin | Aug. 9, 1927 |
| 1,669,622 | Messer | May 15, 1928 |
| 2,010,049 | Abbott | Aug. 6, 1935 |
| 2,079,585 | Sloman | May 4, 1937 |
| 2,131,979 | Seidl | Oct. 4, 1938 |
| 2,572,369 | Mitchell | Oct. 23, 1951 |